3,426,279
AUTOMATIC FREQUENCY SCANNING IN A TWO-WAY RADIO COMMUNICATION SYSTEM

Leon Berman, Asnieres, France, assignor to C.I.T.—Compagnie Industrielle des Telecommunications, Paris, France Filed Sept. 20, 1966, Ser. No. 580,747
Claims priority, application France, Sept. 21, 1965, 32,119
U.S. Cl. 325—21 11 Claims
Int. Cl. H04b 1/40, 1/44; H04l 5/00

ABSTRACT OF THE DISCLOSURE

A transmitter-receiver system for two-way communication on a modulated carrier frequency selected for each communication from a range of frequencies wherein a transmitter and receiver are connected to a common variable frequency oscillator determining the carrier frequency of both transmission and reception, a scanner connected to the oscillator for varying the frequency thereof, a decoder connected to the receiver for detecting a signal having a given code, control means for de-activating said scanner in response to said decoder, a threshold detector for maintaining said scanner in the de-activated condition, and a coder connected to said transmitter for applying a code to the signal generated thereby.

The present invention relates in general to communications systems, and more particularly to a two-way communications system capable of automatically selecting a carrier frequency of transmission and designating a destination therewith within a given range of frequencies on a traffic basis.

One objective of the present invention is to increase the number of possible communications with a given number of channels. For example, to establish communications between 100 pairs of correspondents (200 correspondents in all), it is possible to assign a carrier frequency to each communication in a group of 100 channels. However, experience shows that, in a group of this type, under given conditions of normal operation outside of peak periods, there are rarely more than seven communications operating simultaneously providing a 7% traffic rate of use. As a result, the over-all effective use at any given time of the assigned spectrum is low. On the other hand, if use is made of a method of dividing the channels between communications on a traffic basis, which will be defined below in accordance with the invention, the communication system can only comprise simultaneously occupied channels. With the same 7% statistical traffic rate, it can be seen that 100 channels formerly capable of handling only 100 pairs of correspondents will thus suffice to assure communication between 1,430 pairs of correspondents, or 2,860 correspondents. Thus, the economy in number of channels is considerable. As a result, the various channels of the spectrum are shared between several possible communications, the destination of any one channel in traffic being effectively defined by a certain code corresponding to the desired destination.

Systems in which the frequencies are shared between several possible communications are known. In one, three impulses, emitted on three carrier frequencies, for example, 141, 142, 143 mHz., are modulated by displacement in time. These impulses are shifted between themselves by a certain number of microseconds: these shifts constitute a code, varying with each communication to be established. In the destination's receptor, the correspondence is established between the three trains of impulses by the decoding delay lines of this particular receptor; this correspondence causes the operation of the low frequency portion of the receiver at the destination, which receives the message.

Such a system, which operates correctly in principle, actually has two inconveniences. First, it is not compatible with known systems; the corresponding equipment cannot traffic with known type equipment. Second, above a certain traffic level, impulse coincidences are produced which considerably deteriorate the signal/noise ratio by creating a strong unintelligible cross talk by parasitic unblocking of the receiver.

There are other types of communications which use shared channels, called "TASI" or "CELTIC," in which a channel momentarily freed by a pause in speech in a given communication can be assigned to another communication. These systems, mostly in transatlantic telephone cable service, can appreciably increase (to a ratio above 3) the capacity of such a cable and take the best advantage of a costly investment.

The object of the invention is to produce a radio communication by carrier frequencies, according to which, in the limits of a given frequency range, divided into a certain number of channels, a communication involving a given participant is not limited in a fixed manner by a frequency corresponding to a determined channel assigned to the participant, but can occupy any free channel in the said range at the particular time. The communication occupies one of the free channels upon initiation of the transmission and is characterized or identified by a certain code corresponding to the destination. For reception, among all the channels which are being used within the range's limits, the channel involving the destination is selectively reecived, notably, by way of decoding the code corresponding to this destination. It is a question of a finite number of channels, of principally equal width, together occupying a spectrum having given boundaries, which are shared between a certain number of possible communications.

The present invention, which seems to have a certain analogy with the two preceding known systems utilizing the sharing of channels between communications, is, however, different from these known systems or any combination thereof, as will be shown in the following detailed description of the invention.

The invention more particularly concerns two-way radio communications; this means that a single carrier frequency is used in one communication direction (W-E) or in the other (E-W). It absolutely does not predict the type of modulation.

The system of the invention uses an automatic frequency scanner. The establishment of communication is preceded by a blocking of frequency scanning on a determined channel. Two different operations or conditions can block the scanner: First in a receiver receiving a call at the start of a communication (receiver is called party), the frequency exploration is blocked by the decoding of a code from the calling emission, a code which was constituted at the emission as a function of the desired destination. The emission frequency of the called station is determined at the same time, because it is the same as that of the emitter of the calling station, or the same as that which is received. Second, in a transmitter preparing to call, the frequency exploration is blocked when the associated receiver (receiver is calling party) is reached upon reception of an unoccupied channel. It is understood that, with the emission and reception frequency always the same, the frequency is regulated, as below, at the same time for the receiver and for the transmitter of the calling station.

The code intervenes to define the track of the called station, while it does not intervene to define the track of the calling station. This code can have any desired form, or frequencies, impulses, etc.

According to the invention, at each station in a two-way radio communication with a transmitter and a receiver operating by frequency transposition and with a single oscillator defining the emission and reception channel, the said oscillator scans, by known means, to find an adequate channel in a given spectrum. Each station is assigned a coded address which is transmitted on a channel of the said spectrum by a transmitter calling the said station, and the scanning of the said called station is blocked when its receiver has decoded the coded address received on the said track, which fixes its transmission-reception traffic frequency. While elsewhere, in a calling station, the traffic frequency is fixed by the passage of the scanning upon the reception of an unoccupied track, which causes the blocking of the scanner.

According to another aspect of the invention, during scanning, the low frequency portion of the receiver is blocked, and the scanning blocking is accompanied by the unblocking of this portion.

According to another characteristic, a receiver comprises, at the output of an intermediary frequency amplifier, a decoder feeding a first input of an inverter whose output can produce a signal to simultaneously block the frequency scanning, unblock the low frequency portion of the receiver and unblock the associated transmitter. The second input of the said commutator is connected, by way of a logical inverter, to a detector circuit connected to the output of the said intermediary frequency amplifier.

It is another object of the present invention to provide a two-way communications system which avoids or otherwise entirely eliminates the difficulties and disadvantages inherent in known systems of a similar type.

It is another object of the present invention to proviade a communications system of the type described which makes use of a plurality of frequency channels within a given frequency range on a traffic basis.

It is a further object of the present invention to provide a communications system of the type described which is not fixed to a given transmission frequency but automatically selects one of a plurality of available frequency channels for transmission.

It is still another object of the present invention to provide a communications system of the type described which makes maximum and most efficient use of the range of frequencies available to it.

These and other objects, features, and advantages of the present invention will become more apparent from the following detailed description thereof when taken in conjunction with the accompanying drawings which illustrate an embodiment of the present invention, and wherein.

Figure 1:
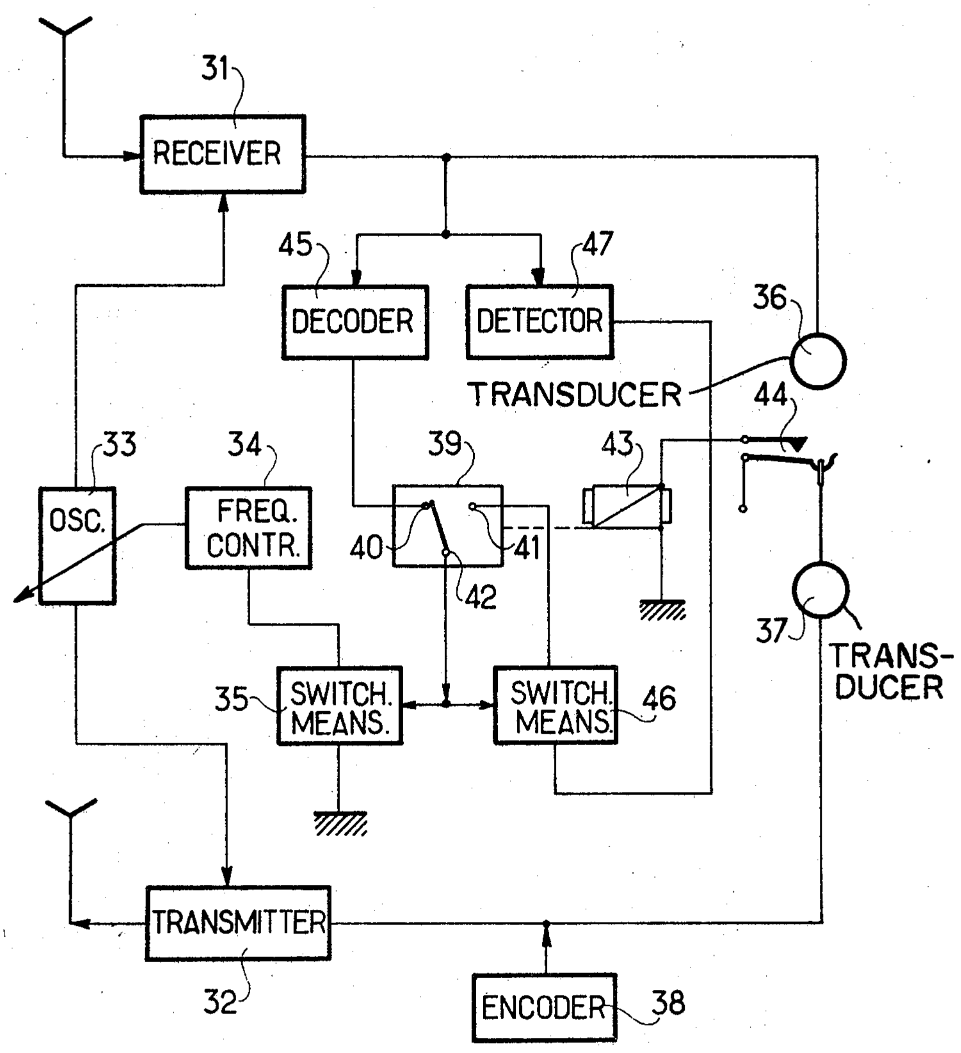
FIGURE 1 is a simplified schematic block diagram of the invention.

As is represented in FIGURE 1, a receiver 31 and transmitter 32 are associated with a single variable frequency drive oscillator 33, defining the carrier frequency serving for reception and transmission. The frequency variation of the oscillator 33 is controlled by a scanning device 34 (for example, a saw tooth voltage generator) whose operation is controlled by member 35 which can be a conventional type switch means effective to activate and de-activate the scanner 34. This switch member 35 is controlled by a logical signal, and can be, for example, a normally closed relay, opening and remaining open by the action of a voltage applied to one control terminal.

The output of the receiver 31 is connected to a transducer member, for the reception of messages, which can be, for example, constituted by a filter, passing only the frequency spectrum of the following message of a receiver, such as a loud-speaker or a recorder, schematically represented by the element 36.

The transmitter 32 comprises an input connected to a transducer member 37 for the transmission of a message and can be constituted, for example, by a microphone. A device to generate the identification signal of a called station is represented by the encoder element 38, which is connected in such a way as to inject the station's identification signal at the input of the transmitter 32. In the case where the encoder element 38 is permanently connected to the transmitter 32, the transducer member must comprise a filtering means to eliminate the identification signals from the spectrum received.

The device, according to the invention, must also comprise a commutation element 39 comprising two input terminals 40 and 41 which can be alternately connected to an output terminal 42. This commutation device is such that the connection between the terminals 40 and 42 can only be broken when the terminals 41 and 42 are connected.

As an example, the commutation element 39 can comprise a relay 43 controlled by a contact 44 mechanically connected to the transducer member 37 by means of a hook-switch, or the like.

The input terminal 40 of the element 39 is connected to the output of a decoder 45 whose input is connected at the output of the receiver 31. In principle, this decoder is a device capable of emitting a logical signal, such as a "0" or "1" signal level, when a certain identification signal is received by the receiver 31. The switching means 46 is of any type providing a normally closed position and being responsive to reception of a logical signal on a control terminal for opening the circuit.

The device illustrated in FIGURE 1 functions as follows:

In a static condition, the switch elements 35 and 46 are closed and the communication between terminals 40–42 is established in element 39. The frequency scanning device 34 is operating and when the decoder 45 receives the identification signal of the station on a certain frequency, it applies a logical signal to the switch member 35 through element 39 blocking the frequency scanning by disabling the scanner 34. The oscillator 33 is thus locked on the proper frequency and the transducer member 36 thus receives the message from receiver 31. The raising of the hook-switch carrying the transducer member 37 excites the relay 43 which connects the threshold detector 47 to switch 35 through element 39 which thus keeps the scanning cut off as long as a carrier frequency is detected in detector 47. The transmission can occur in both directions by way of a commutation device, not represented in FIGURE 1, alternately connecting the antenna to the receiver or to the transmitter in the well-known manner.

Figure 2:
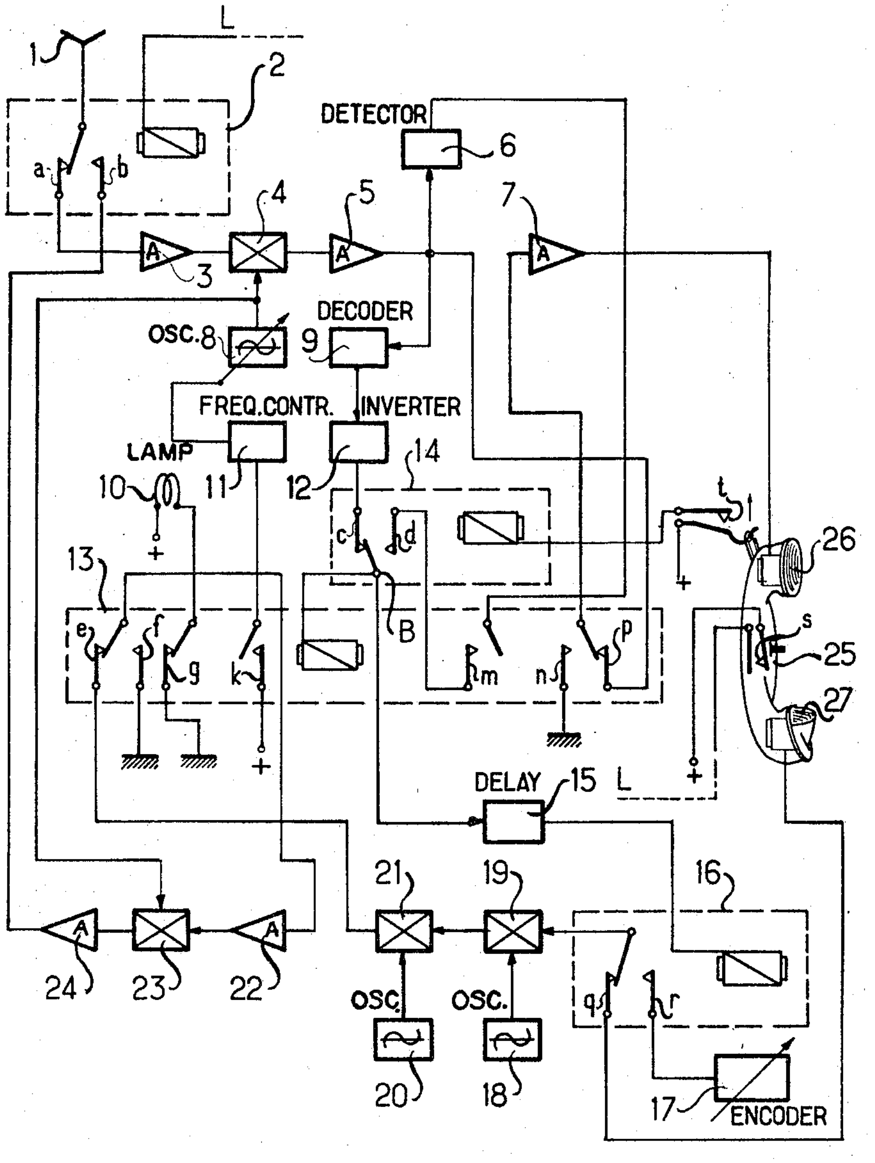
FIGURE 2 is a more detailed schematic block diagram of the invention.

To call a correspondent, the elements being at rest as defined above, the raising of the member 37 results in closing of the hook-switch on contact 44, establishing the connection 41–42 in element 39 due to energization of relay 43 and connects the detector to the control terminal of the switching means 35. The detector emits a logical signal which blocks the scanning when the detector finds a free frequency in the frequency range. The system is then ready for transmission via transducer 37 and transmiter 32. FIGURE 2 shows a more detailed circuit of a receiver-emitter according to the invention.

All the relays in FIGURE 2 are represented in the resting position. In a transmission-reception station, an antenna 1 can be used for transmission or reception with the help of a relay-switch 2 having two positions, *a* and *b*, for connecting the antenna to the receiving and transmitting portions of the system, respectively. The receiver comprises a high frequency amplifier 3, a mixer 4, an intermediary frequency amplifier and detector 5, a low frequency amplifier 7, and a loud speaker or receiver 26 preferably contained in a combination handset 25.

For ease in understanding without restraining the generality of the invention's applications, the spectrum to be received covers the 140–143 mHz. band amplified in the amplifier 3, for example. This spectrum is subdivided into 100 channels each having a 31 kHz. width; it is supposed that the modulation is, for example, a frequency modulation. The amplifier 5 covers a 30 mHz.± 15 kHz. band.

An oscillator 8 can cover a 170–173 mHz. band under the effect of an automatic frequency control circuit 11, with the possibility of stop and hold on a fixed frequency with suitable control thereof. This variation of frequency in the frequency control 11 can be obtained by electronic means, for example, by a saw tooth voltage applied to a variable capacity diode associated with the oscillating circuit of the oscillator 8. Or, the frequency variation can be assured by a step-by-step switching acting on the tapping of a potentiometer connected to the said variable capacity diode, or still the said step-by-step action may commutate capacities in parallel on the oscillating circuit to achieve the desired operation. In the scope of the invention, the control circuit 11 can be embodied in any adequate known form, the step-by-step switching furnishing one solution among others.

An output terminal of the amplifier 5 feeds three members: a decoder 9 followed by a logical inverter 12, a threshold detector 6, and a contact *p* of a logical inverter *np* whose mobile contact is connected to a low frequency amplifier 7.

A relay switch *cd*, which is part of a relay 14 is fed at terminal *c* by the logical inverter 12 and at terminal *d* by the signal from the output of the threshold detector 6 when a contact *m* is closed. The relay 14 is such that the contact *d* closes before the opening of contact *c*. The common point B of the relay contacts *cd* feeds the excitation winding of a relay 13, which comprises contacts *ef*, a contact *g*, a contact *k*, a contact *m*, and contacts *np*. This same point B can also feed, across a delay member 15, a relay 16 commanding an inverter *qr*. The element 10 connected through contact *g* to a source of potential is a signaling member, for example, a lamp.

The transmitter comprises a first oscillator 18 having a fixed frequency, for example, 2 mHz., whose output current is modulated in a modulator 19 either by a microphone 27 contained in the handset 25 (relay 16 de-energized), or by a variable encoder 17 (relay 16 energized). A first frequency transposition mixer 21, fed by an oscillator 20 operating, for example, on 32 mHz., connects the output of the modulator 19 to the contact *e* of the relay 13. An amplifier 22, amplifying, for example, a 30 mHz.±15 kHz. band, can be connected to the mixer 21 by the mobile contact of the relay contacts *ef* of the relay 13. A second mixer 23, fed by the output current of the amplifier 22 and by the frequency furnished by the oscillator 8, is connected to the input of an output amplifier 24 which is capable of amplifying the 140–143 mHz. band.

The relay 14 is at rest when the handset 25 is hung up; the contact feeding this relay is thus open. The handset 25 comprises a contact *s* called "pedal." When the operator presses the contact *s*, the relay 2 is fed by positive potential from the line L and goes into the energized condition. The contact *b* is closed and the antenna 1 is connected to the transmitter. On the other hand, while the contact *s* is open, the relay 2 is at rest, and the antenna 1 is connected to the receiver by the contact *a*.

While the relay 13 is at rest (position represented on the figure), the mixer 21 feeds the amplifier 22 of the emitter (contact *e* closed), the signal lamp 10 is fed (contact *g* closed), the scanning control 11 is stopped (*k* open,) the threshold detector 6 is cut off from the contact *d* (*m* open) and the amplifier-detector 5 feeds the low frequency amplifier 7 which excites the receiver (contact *p* closed). When the relay 14 is de-energized, the logical inverter 12 feeds the relay 13 (contact *c* closed). When the relay 13 is working, the input of the amplifier 22 is grounded (contact *f* being closed), the signal device 10 is no longer fed (*g* open), the frequency scanner is operating (*k*- closed), the threshold detector 6 feeds the contact *d* (*m* closed) and the input of the amplifier 7 is open, *n* being closed. When the relay 14 is energized, the point B is connected to the threshold detector 6 (*d* closed) if the relay 13 is operated (*m* closed).

The operation of the device of FIGURE 2 is as follows:

During a state of watching without an existing call, with the handset hung up, the relay 2 is de-energized and the antenna is in reception position connected to amplifier 3. The relay 14 is not operated and contact *c* thereof is fed by the inverter 12 which transmits a logical signal "1," because the decoder 9, which receives no code, permanently transmits a logical signal "0." The relay 13 is operated by the logical signal from the inverter 12 via point B and the frequency scanning is going on; the signal lamp 10 is extinguished, the transmitter is blocked, and the receiver is blocked.

The encoder 17 is connected by the operated relay 16 to the input of the mixer 19, but it is in an inert position without coding.

Upon reception of a call with the handset still hung up, the relays 2 and 14 are not changed. A code having been emitted by a correspondent, the decorder 9 is excited, the logical inverter 12 transmits a zero to point B, the relay 13 becomes de-energized, the frequency scanner stops, the signal lamp 10 lights up, the contact *m* is opened, the detector 6 is eliminated from the circuit, and the low frequency portion of the receiver (amplifier 7 and receiver 26) is connected to the output of the amplifier-detector 5.

The amplifier 24 of the transmitter is excited and connected to the output of the modulator 23. However, at the end of a certain time as determined by the delay member 15, the relay 16, which was operated, comes to rest and the microphone 27 is connected to the input of the transmitter. The reason for this delay will be seen below.

In the case of reception of a message by the called party with the handset not hung up, the called correspondent, alerted by his signal, unhooks his handset and places the receiver at his ear. The hook changes the relay switch to connect contact *d* to point B. The contact *m* being open (relay 13 at rest), no current from the threshold detector 6 can re-engage the relay 13 and the frequency scanning is thus stopped. The called correspondent receives the message of the caller.

In the case of answer of the called party with the handset not hung up, the called correspondent presses on his talk button controlling the contact *s*, which places his antenna 1 in the transmission position. By speaking in the microphone 27, a message is transmitted to the calling station.

In the case of transmission of a call by the calling station with the handset not hung up, the calling correspondent forms the coded address of the desired correspondent on his encoder 17. In picking up his handset, he presses on the contact *s* with the talk button. The relay 14 being operated, the relay 13 is fed by the threshold detector 6. The frequency scanner, which worked before the handset was picked up, continues at the start of the operation while the calling party's receiver receives channels already occupied by transmission. By the action of the frequency scanning, the receiver passes on to the first unoccupied track, determined when the threshold detector 6 no longer feeds the relay 13, which comes to rest. The frequency scanner stops and remains stopped, the contact *m* being open. The communication can then be established. However, it is effectively established only when the frequency of the called party passes on to the frequency of the caller. For this, it is necessary that the calling station maintains the code of the called party for at least the duration of one complete frequency scan. Thus, after the frequency scanning stops on the command of the threshold detector, the emitter must remain engaged on the encoder 17 for a certain time, whence the necessity of the delay member 15.

Henceforth, the correspondents exchange their messages by alternately pressing and releasing their pedal. At the end of communication, the two correspondents hang up their handsets. The frequency scanning resumes immediately in the two stations.

The embodiment described above is provided only as an example of in many variations possible within the scope of the invention. To not complicate this description, a certain number of known members performing accessory functions were systematically omitted from the description (such as security members, etc.). However, the use of such members will be obvious to one of ordinary skill in the art.

The commutation operations were described as comprising electro-mechanical relays. In the scope of the invention, all or a portion of these members can be replaced by electronic commutators.

While I have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

I claim:

1. A transmitter-receiver system for two-way communication between two correspondents of a plurality of correspondents, by means of a modulated carrier frequency taken from a range including a plurality of frequency channels, comprising:

a receiver circuit and a transmitter circuit associated with a single variable frequency oscillator for emission and reception on a common carrier, frequency scanning means connected to said oscillator to vary its frequency across the said range, first control means connected to said scanning means responsive to a logical signal for de-activating said scanning means, decoding means having an input connected to the output of the said receiver circuit for furnishing a logical signal to said control means upon reception of an identification signal at the output of the said receiver circuit, threshold detection means having one input connected to the output of the said receiver circuit for furnishing a logical signal upon reception of a carrier signal at the output of said receiver circuit, second control means connected to said threshold detection means responsive to a logical signal for applying said logical signal to said first control means, two state switching means comprising an output terminal connected, in a first state to a first input terminal, and in a second state to a second input terminal, the said switching means being such that the connection between the said first input terminal and the output terminal can only be broken upon connection between the second input terminal with the output terminal, the said first input terminal being connected to the output of the said decoding means, the said second input terminal being connected to the output of the said threshold detection means by said second control means having a control terminal sensitive to a logical signal, the said output terminal being connected to the control terminals of the said first and second control means.

2. The combination according to claim 1, in which the said first and second control means are respectively formed by two pairs of contacts of a single relay means including a control terminal connected to the output terminal of the said switching means.

3. The combination according to claim 1, in which the said switching means comprises a relay responsive to manual control, and further including a transducer means for the transmission of a message connected to the input of the said transmitter and hook-switch means carrying said transducer means and manually actuated to operate said switching means.

4. A transmitter-receiver system for a two-way communication between two correspondents of a plurality of correspondents by means of a modulated carrier frequency taken from a range including a plurality of frequency channels, comprising:

a combination comprising an input transducer means for the reception of a message and an output transducer means for the transmission of a message, a variable frequency oscillator, a transmitter having an input connected to said output transducer means, and a receiver, said transmitter and said receiver being respectively connected with said variable frequency oscillator for emission and reception on a common carrier, frequency scanning means connected to said oscillator to vary the value of its frequency across said range, control means connected to said scanning means for disabling said scanning means, decoding means including a code identification means having an input connected to the output of the said receiver and an output connected to said control means capable of stopping the operation of the said frequency scanner in response to excitation of said control means from the decoding means, and means connecting the output of the said receiver to said input transducer means.

5. A transmitter-receiver system for two-way communication between two correspondents of a plurality of correspondents by means of a modulated frequency carrier taken from a range including a plurality of frequency channels, comprising:

a combination comprising input transducer means for the reception of a message, and output transducer means for the transmission of a message.

a variable frequency oscillator, a receiver having an input connected to the said input transducer means, and a transmitter, said receiver and transmitter being respectively connected with said variable frequency oscillator for emission and reception on a common carrier, frequency scanning means connected to said oscillator to vary the value of its frequency across said range, control means connected to the said scanning means for disabling said scanning means, threshold detection means sensitive to the existence of a carrier in the frequency range having an input connected to the output of the said receiver and an output connected to said control means capable of stopping the operation of the said frequency scanning means in response to excitation of said control means from the said detector, and means connecting the said output transducer means to the input of the said transmitter.

6. A transmitter-receiver system for two-way communication between two correspondents of a plurality of correspondents by a modulated carrier frequency taken in a range including a plurality of carriers, comprising:

a variable frequency oscillator, a transmitter circuit and a receiver circuit associated with said variable frequency oscillator for emission and reception on a common carrier, an output transducer means connected to the said receiver, frequency scanning means connected to said oscillator to vary its frequency across said range, control means connected to said scanning means to selectively stop the frequency scanning upon reception of a logical signal, decoding means connected to the output of said receiver for producing said logical signal in response to reception of an identification signal in said receiver, threshold detection means connected to the output of said receiver for producing said logical signal upon reception of a carrier within the said frequency range, a first two state control circuit having a first input terminal connected to the output of the said decoding means and a second input terminal connected to the output of the said detection means and having an output connected via said control means to the said scanning means to block the scanning in a first state upon excitation of the said decoding means and in a second state in the absence of excitation of the said threshold detection means, the said control circuit also comprising means to start the said scanning in the absence of excitation of the said decoding means and in the presence of excitation of the said detection means.

7. The combination according to claim 6, further including a combination comprising an input transducer means connected to the output of said receiver for the reception of a message and an output transducer means for the transmission of a message, an identification signal generator and a second two state control circuit connected to the said control means wherein a first state the said decoding means is not excited and the said detection means is excited with said frequency scanner being engaged, for connecting the input of the said transmitter to the output of the said signal generator, and in a second state, with the said decoding means being excited and the said detection means not being excited with the frequency scanner being blocked, for connecting the said input of the transmitter to the said output transducer means.

8. The combination according to claim 7, wherein said second two state control circuit is connected to said control means through a delay means whereby the connection of the output transducer means to said transmitter is effected a certain time after the blocking of the said scanning means.

9. The combination according to claim 6, wherein said control means includes a relay which is excited by the said decoding means in the first state of the said first two state control circuit, and which is excited by the said detector in the second state of the first two state control circuit.

10. The combination according to claim 6, further including an antenna, and commutator means capable of alternately connecting the input of the said receiver and the output of the said transmitter to said antenna for the reception and emission of messages.

11. A transmitter-receiver system for two-way communication between two correspondents of a plurality of correspondents, by means of a modulated carrier frequency taken from a range including a plurality of frequency channels, comprising:

a receiver circuit and a transmitter circuit coupled to a varaible frequency oscillator for emission and reception on a common carrier, frequency scanning means connected to said oscillator to vary its frequency across the said range, control means having first and second inputs and an output connected to said scanning means for de-activating said scanning means, decoding means having an input connected to the output of the said receiver circuit and an output operatively coupled to the first input of said control means for causing the control means to de-activate the scanning means upon the reception of a coded identification signal at the output of the said receiver circuit, and threshold detection means having an input connected to the output of the said receiver circuit and an output operatively coupled to the second input of said control means for causing the control means to de-activate the scanning means in the absence of a carrier signal at the output of said receiver circuit.

References Cited

UNITED STATES PATENTS

| | | | |
|---|---|---|---|
| 2,958,768 | 11/1960 | Brauer | 343—179 |
| 2,894,258 | 7/1959 | Vantine | 325—22 |

ROBERT L. GRIFFIN, *Primary Examiner.*

A. MAYER, *Assistant Examiner.*

U.S. Cl. X.R.

343—179